(12) United States Patent
Sunkle et al.

(10) Patent No.: US 11,461,396 B2
(45) Date of Patent: Oct. 4, 2022

(54) SYSTEM AND METHOD OF EXTRACTION OF INFORMATION AND GRAPHICAL REPRESENTATION FOR DESIGN OF FORMULATED PRODUCTS

(71) Applicant: Tata Consultancy Services Limited, Mumbai (IN)

(72) Inventors: Sagar Sunkle, Pune (IN); Deepak Jain, Pune (IN); Krati Saxena, Pune (IN); Ashwini Patil, Pune (IN); Rinu Chacko, Pune (IN); Beena Rai, Pune (IN); Vinay Kulkarni, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 35 days.

(21) Appl. No.: 17/125,246

(22) Filed: Dec. 17, 2020

(65) Prior Publication Data
US 2022/0012287 A1    Jan. 13, 2022

(30) Foreign Application Priority Data
Jul. 8, 2020   (IN) ............................. 202021029108

(51) Int. Cl.
*G06F 16/901*   (2019.01)
*G06F 16/28*    (2019.01)
(Continued)

(52) U.S. Cl.
CPC ........ *G06F 16/9024* (2019.01); *G06F 16/245* (2019.01); *G06F 16/285* (2019.01); *G06F 16/36* (2019.01)

(58) Field of Classification Search
None
See application file for complete search history.

(56) References Cited

U.S. PATENT DOCUMENTS

| 8,966,439 B2 | 2/2015 | Wolfram |
| 10,372,713 B1 | 8/2019 | Blake et al. |

(Continued)

FOREIGN PATENT DOCUMENTS

| DE | 102005020083 B4 | 1/2010 |
| WO | WO2018220368 A1 | 12/2018 |

OTHER PUBLICATIONS

Olivier Elemento; A Universal Framework for Regulatory Element Discovery across All Genomes and Data Types; Princeton; 2007; pp. 337-351 (Year: 2007).*

*Primary Examiner* — Amresh Singh
*Assistant Examiner* — Jermaine A Mincey
(74) *Attorney, Agent, or Firm* — Finnegan, Henderson, Farabow, Garrett & Dunner, LLP

(57) ABSTRACT

This disclosure relates to method of extracting an information associated with design of formulated products and representing as a graph. A graph domain model of a plurality of vertices, and at least one formulation text as text file are received as an input. The information extraction is applied to identify at least one sentence and extract at least one subject-verb-object triple from every sentence of the at least one formulation text. A sentence including an ingredient listing and associated weights indicated by presence of weight numerals, and a sentence including at least one verb from the at least one subject-verb-object based on the graph domain model are classified. A representation of the recipe text is generated in terms of at least one action, ingredients on which the at least one action is performed, and condition. An insert query string is generated and executed to store the formulations as the graph.

15 Claims, 6 Drawing Sheets

(51) Int. Cl.
  *G06F 40/279* (2020.01)
  *G06F 40/30* (2020.01)
  *G06Q 10/10* (2012.01)
  *G06F 16/245* (2019.01)
  *G06F 16/36* (2019.01)

(56) References Cited

U.S. PATENT DOCUMENTS

| | | |
|---|---|---|
| 2003/0059837 A1 | 3/2003 | Levinson et al. |
| 2009/0326911 A1* | 12/2009 | Menezes ............... G06F 40/55 704/2 |
| 2012/0084299 A1 | 4/2012 | Cai et al. |
| 2013/0308840 A1 | 11/2013 | Tallapragada et al. |
| 2018/0253426 A1 | 9/2018 | Oh et al. |
| 2020/0184155 A1* | 6/2020 | Galitsky ............... G06F 40/205 |

\* cited by examiner

| Type of formulation | Formulation Type name: 'Cosmetic and Toiletry' |
|---|---|
| Category within a type formulation | Formulation Category name: 'Creams' |
| Name of the formulation | Formulation name: 'acid ph. oil-in-water cream - b' |
| Ingredients with quantities, mixtures of ingredients [*phase, part*, etc.] | Ingredient name: 'witconol mst (glyceryl stearate)', quantity:'10.0' <br><br> (: Mixture (name: 'oil phase')) |
| Recipe/ formulation consisting of actions and specialization/ characterization of actions | Recipe Text; Recipe Action Graph <br><br> Recipe Action Graph String Repr <br><br> Action name: 'heat', node_id:'1') - [: Uses]-> (:Constituent name : 'each phase')-[:Under Condition]-> <br><br> (: Condition name: 'to 70 to 75c'), |

FIG. 4 ns, and, more particularly, to system and method of extraction of information and graphical representation for design of formulated products.

SYSTEM AND METHOD OF EXTRACTION OF INFORMATION AND GRAPHICAL REPRESENTATION FOR DESIGN OF FORMULATED PRODUCTS

PRIORITY CLAIM

This U.S. patent application claims priority under 35 U.S.C. § 119 to: India Application No. 202021029108, filed on Jul. 8, 2020. The entire contents of the aforementioned application are incorporated herein by reference.

TECHNICAL FIELD

This disclosure relates generally to chemical formulations, and, more particularly, to system and method of extraction of information and graphical representation for design of formulated products.

BACKGROUND

Chemical industry is a very diverse sector, with a wide range of processes and products which are highly interlinked. The products include basic organic materials such as olefins, aromatics, biochemicals and plastics; and basic inorganic materials such as engineered particles, inorganic chemicals, acids, gases which are produced from raw extracted materials and sustainable feedstocks. These basic chemicals, or ingredients, are then used downstream as building blocks for formulation of complex materials and substances such as special chemicals and consumer products. These formulated materials and substances, also referred to as formulated products, comprise a combination of raw materials engineered and designed to form powders, granules, tablets, creams, suspensions, foams, gels and emulsions all displaying a set of targeted properties.

Formulations are an integral part of various industries such as personal care products, pharmaceuticals, paints, coatings, fertilizers, dyes, fuels and foods. The formulations are generally a mixture of several chemicals (organic/inorganic). Chemical formulations contain ingredients that undergo a step-by-step procedure such as heating, cooling, stirring, mixing, etc. so as to obtain specific target properties, both physical and chemical. Any new formulation to be prepared closely follows the steps in the existing formulations based on the similarity of the ingredients and the desired attributes of the final formulation. Many such formulations are a result of trial-and-error based experimentations.

The recipes of such formulations are usually available as textual data in the form of written, printed and online content. Experts find similar formulations using standard file search and compilation, leading to extended time frames and costs. Vast amount of textual data is available occurring in sources such as textbooks, handbooks, journal articles, and specialized web sites. These texts are available in a form that makes at best a file search possible but cannot be queried. The information present in such texts contains a variety of domain-specific information such as the type of ingredients, mixtures of ingredients, functionalities and their compositions, their physical attributes such as weights, etc. In the search for a new formulation, an expert must refer the already existing recipes to make rational judgments on the ingredients to be chosen, their respective quantities and the procedure to follow so as to get a stable formulation that has the desired chemical function.

The existing methodologies rely on manual data entry if at all, of the details of chemical formulations. The present techniques rely mainly on file search in general or crude data search in case of manually created database in the form of excel spreadsheets. Further, the present techniques rely on domain experts to provide one or more clues as to what is to be searched via file search since the knowledge is not explicated.

SUMMARY

Embodiments of the present disclosure present technological improvements as solutions to one or more of the above-mentioned technical problems recognized by the inventors in conventional systems. For example, in one aspect, a processor implemented method of extracting an information associated with design of formulated products and representing as a graph is provided. The processor implemented method includes at least one of: (a) receiving, via one or more hardware processors, a graph domain model of a plurality of vertices as an input; (b) receiving, via the one or more hardware processors, at least one formulation text as at least one text file; (c) applying, via the one or more hardware processors, information extraction, to identify at least one sentence and extract at least one subject-verb-object triple from every sentence of the at least one formulation text; (d) classifying, via the one or more hardware processors, at least one of: (i) sentences comprising an ingredient listing and associated weights indicated by presence of weight numerals, and (ii) sentences comprising at least one verb from the at least one subject-verb-object based on the graph domain model; (e) generating, via the one or more hardware processors, a representation of the recipe text based on the at least one sentence which is classified in terms of at least one action (A), mixtures (M) on which the at least one action is performed, and at least one condition (C); (f) generating, via the one or more hardware processors, an insert query string from the generated representation based on the graph domain model; and (g) executing, via the one or more hardware processors, the generated insert query string to store the formulations as the graph.

In an embodiment, the plurality of vertices may correspond to at least one of: (i) a formulation type, (ii) a formulation category, (iii) a formulation ingredient, (iv) a mixture, (v) the recipe text, (vi) an action, (vii) a condition, and combination thereof. In an embodiment, the processor implemented method may further comprise, segregating, via the one or more hardware processors, at least one of: (i) a name, (ii) an ingredient list, and (iii) the recipe text from the at least one formulation text based on a predefined list of verbs and at least one mixture indicator. In an embodiment, the at least one verb from the predefined list of verbs may separate the ingredient listing from the recipe text. In an embodiment, the at least one action may correspond to the at least one verb from the predefined list of verbs. In an embodiment, the recipe text may be extracted by creating plurality of dictionary of verbs that are representative of actions performed on the ingredients and the mixtures.

In another aspect, there is provided a system to extract an information associated with design of formulated products and representation as a graph. The system comprises a memory storing instructions; one or more communication interfaces; and one or more hardware processors coupled to the memory via the one or more communication interfaces. The one or more hardware processors are configured by the instructions to: (a) receive, a graph domain model of a plurality of vertices as an input; (b) receive, at least one formulation text as at least one text file; (c) apply, information extraction, to identify at least one sentence and extract at least one subject-verb-object triple from every sentence of the at least one formulation text; (d) classify, at least one of: (i) sentences comprising an ingredient listing and associated weights indicated by presence of weight numerals, and (ii) sentences comprising at least one verb from the at least one subject-verb-object based on the graph domain model; (e) generate, a representation of the recipe text based on the at least one sentence which is classified in terms of at least one action (A), mixtures (M) on which the at least one action is performed, and at least one condition (C); (f) generate, an insert query string from the generated representation based on the graph domain model; and (g) execute, the generated insert query string to store the formulations as the graph.

In an embodiment, the plurality of vertices may correspond to at least one of: (i) a formulation type, (ii) a formulation category, (iii) a formulation ingredient, (iv) a mixture, (v) the recipe text, (vi) an action, (vii) a condition, and combination thereof. In an embodiment, the one or more hardware processors may be further configured by the instructions to: segregate at least one of: (i) a name, (ii) an ingredient list, and (iii) the recipe text from the at least one formulation text based on a predefined list of verbs and at least one mixture indicator. In an embodiment, the at least one verb from the predefined list of verbs may separate the ingredient listing from the recipe text. In an embodiment, the at least one action may correspond to the at least one verb from the predefined list of verbs. In an embodiment, the recipe text may be extracted by creating plurality of dictionary of verbs that are representative of actions performed on the ingredients and the mixtures.

In yet another aspect, there are provided one or more non-transitory machine readable information storage mediums comprising one or more instructions which when executed by one or more hardware processors causes at least one of: (a) receiving, a graph domain model of a plurality of vertices as an input; (b) receiving, at least one formulation text as at least one text file; (c) applying, information extraction, to identify at least one sentence and extract at least one subject-verb-object triple from every sentence of the at least one formulation text; (d) classifying, at least one of: (i) sentences comprising an ingredient listing and associated weights indicated by presence of weight numerals, and (ii) sentences comprising at least one verb from the at least one subject-verb-object based on the graph domain model; (e) generating, a representation of the recipe text based on the at least one sentence which is classified in terms of at least one action (A), mixtures (M) on which the at least one one action is performed, and at least one condition (C); (f) generating, an insert query string from the generated representation based on the graph domain model; and (g) executing, the generated insert query string to store the formulations as the graph.

In an embodiment, the plurality of vertices may correspond to at least one of: (i) a formulation type, (ii) a formulation category, (iii) a formulation ingredient, (iv) a mixture, (v) the recipe text, (vi) an action, (vii) a condition, and combination thereof. In an embodiment, the processor implemented method may further comprise, segregating, at least one of: (i) a name, (ii) an ingredient list, and (iii) the recipe text from the at least one formulation text based on a predefined list of verbs and at least one mixture indicator. In an embodiment, the at least one verb from the predefined list of verbs may separate the ingredient listing from the recipe text. In an embodiment, the at least one action may correspond to the at least one verb from the predefined list of verbs. In an embodiment, the recipe text may be extracted by creating plurality of dictionary of verbs that are representative of actions performed on the ingredients and the mixtures.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 illustrates an exemplary table view of a graph domain model and queries for creams as a category of cosmetics and toiletry formulations, according to some embodiments of the present disclosure.

DETAILED DESCRIPTION

Figure 1:
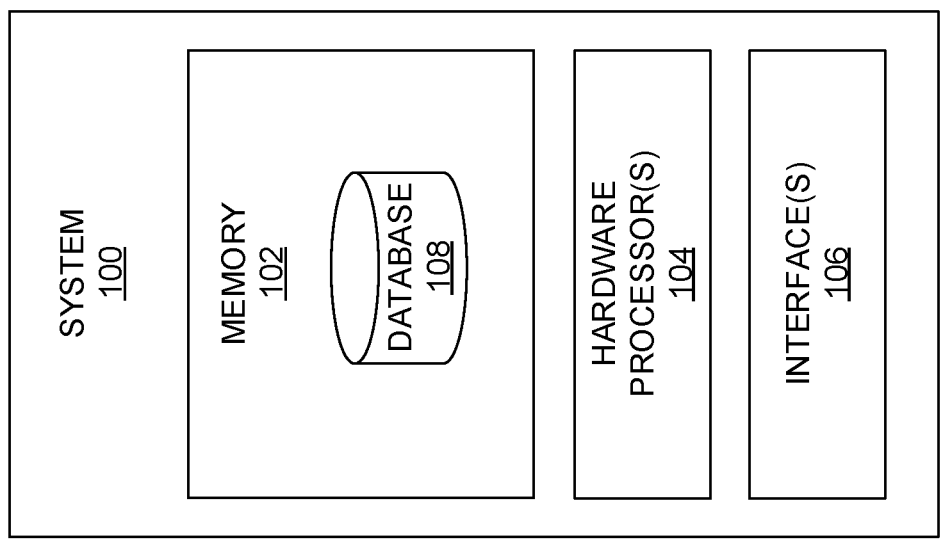
FIG. 1 illustrates a system for extraction of information and graphical representation for design of formulated products, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Formulation is composed of at least two incompatible ingredients which are selected, processed and combined in a specific way to obtain well-defined target properties, functionality and performance. The resulting chemical mixture delivers targeted synergistic effects and properties (e.g., performance, safety, cost optimization, stability) beyond that of individual components. The formulation can exist as a liquid, soft solid, powder, solid or aerosol. A formulated product with a commercial value and is either meant for direct consumer use or for downstream use in industrial applications. The term "formulation" can be used to refer to different things (i) recipe i.e., a list of ingredients (e.g., typically >10 per product) and detailed processing steps; (ii) Formulation=act of formulating something i.e., The combination of processes used for mixing and conditioning of ingredients as well the application of science, know-how and technologies to enable the optimal selection of ingredients and mixing processes; (iii) Formulation=actual blend/mixture of ingredients i.e., processed in a particular manner to have a set of desired physical properties. A chemical formulation text usually contains name of the formulation, ingredients, mixtures (if any), weights/proportions of ingredients, and actions to be performed on the ingredients/mixtures/combinations of ingredients with conditions such as specific temperatures/states which are collectively referred as components of a formulation.

The embodiments of the present disclosure is configured to enable extraction, storage, and retrieval of chemical formulations, making the formulations machine-processable and analyzable. User can query the required information about ingredients, their weights, and details of mixtures for a formulation, actions to be performed on ingredients and/or mixtures. The technical solution of the present disclosure works by: (a) providing means to separately recognize and extract components of a formulation; (b) storing the contents in a specialized schema in a graph database; and (c) enabling a structured query language (SQL) like querying of details of components based on a graph query language. The embodiments of the present disclosure in which both the steps (b) and (c) an open source graph database and the corresponding graph query language are utilized. The embodiments of the present disclosure propose an extraction system, and a graph schema, generates insertion queries as per this schema to store formulations as graphs and enables retrieval through the graph query language.

Referring now to the drawings, and more particularly to FIGS. 1 through 5B, where similar reference characters denote corresponding features consistently throughout the figures, there are shown preferred embodiments and these embodiments are described in the context of the following exemplary system and/or method.

FIG. 1 illustrates a system 100 for extraction of information and graphical representation for design of formulated products, according to some embodiments of the present disclosure. In an embodiment, the system 100 includes one or more processors 104, communication interface device(s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules and a repository for storing data processed, received, and generated by the plurality of modules. The plurality of modules may include routines, programs, objects, components, data structures, and so on, which perform particular tasks or implement particular abstract data types.

Further, the database 108 stores information pertaining to inputs fed to the system 100 and/or outputs generated by the system 100 (e.g., data/output generated at each stage of the data processing), specific to the methodology described herein. More specifically, the database 108 stores information being processed at each step of the proposed methodology.

The repository, amongst other things, includes a system database and other data. The other data may include data generated as a result of the execution of one or more modules in the plurality of modules. The database 108 may store information but are not limited to, information associated with at least one of: a list of verbs and mixture indicators to separate name, ingredient list, and recipe from a formulation text, formulation, ingredients, mixtures (if any), weights or proportions of ingredients, and actions to be performed on the ingredients and mixtures, with conditions such as specific temperatures or states. Further, the database 108 stores information pertaining to inputs fed to the system 100 and/or outputs generated by the system (e.g., at each stage), specific to the methodology described herein. More specifically, the database 108 stores information being processed at each step of the proposed methodology.

Figure 2:
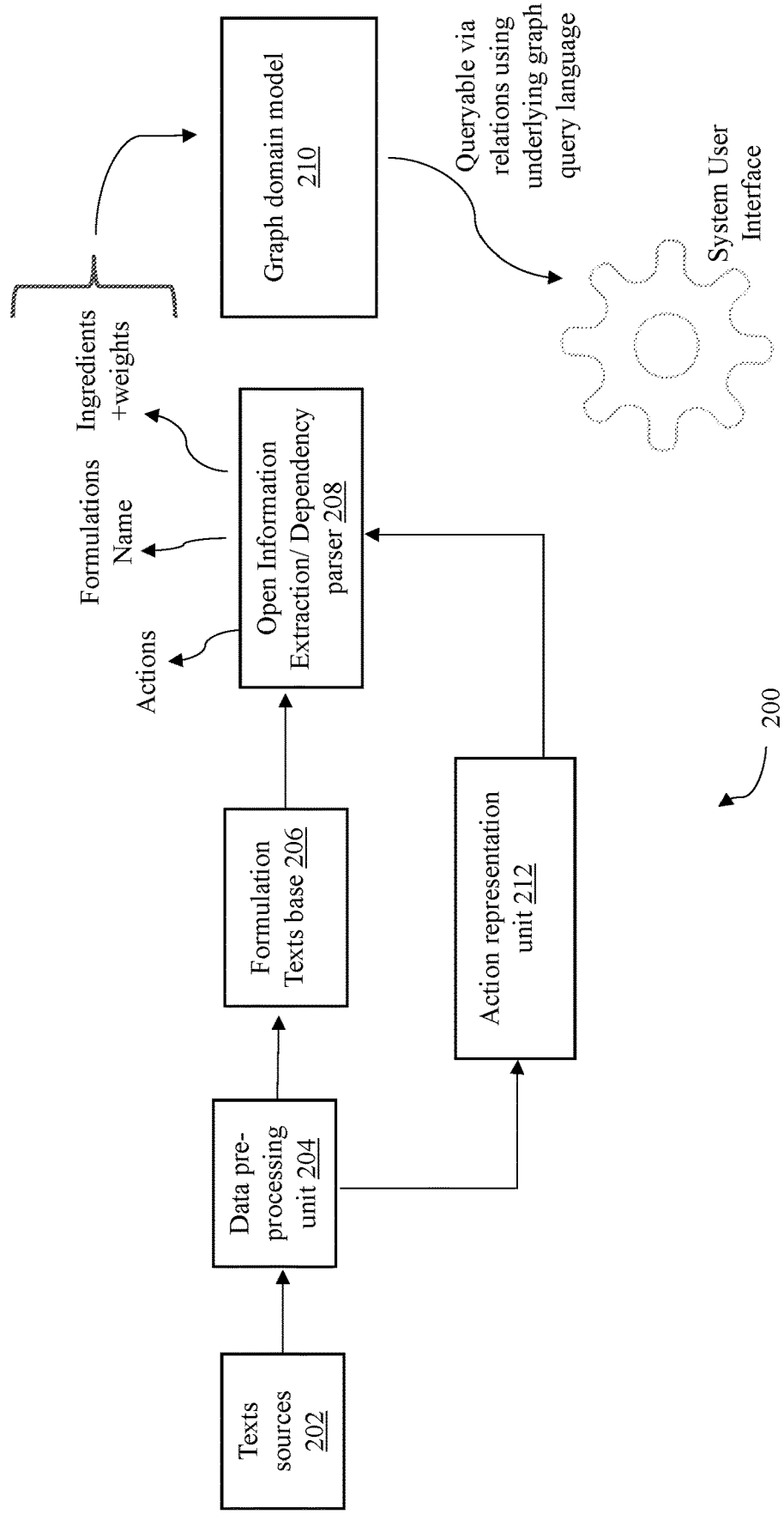
FIG. 2 illustrates an exemplary formulation extraction and retrieval system to extract an information, and graphical representation for design of formulated products, according to some embodiments of the present disclosure.

FIG. 2 illustrates the exemplary formulation extraction and retrieval system 200 to extract the information, and the graphical representation for the design of the formulated products, according to some embodiments of the present disclosure. The formulation extraction and retrieval system 200 includes one or more texts sources 202, a data preprocessing unit 204, a formulation text base 206, an open information extraction/a dependency parser 208, a graph domain model 210, and action representation unit 212. The formulation extraction and retrieval system 200 is configured to extract and store various details about a formulated product, a recipe of which is available as text, including details of ingredients, associated weights, and one or more actions performed on individual ingredients or as a part of a mixture. In an embodiment, the one or more text sources 202 corresponds to textbooks, alternate texts, handbooks, journal articles, and one or more websites.

The formulation extraction and retrieval system 200 receives the graph domain model 210 of a plurality of vertices as an input. In an embodiment, the plurality of vertices may correspond to at least one of: (i) a formulation type, (ii) a formulation category, (iii) a formulation ingredient, (iv) a mixture, (v) the recipe text, (vi) an action, (vii) a condition, and combination thereof. The formulation extraction and retrieval system 200 receives at least one formulation text as at least one text file. An information extraction is applied to identify at least one sentence and extract at least one subject-verb-object triple from every sentence of the at least one formulation text. The formulation extraction and retrieval system 200 is configured to classify at least one of: (i) sentences including an ingredient listing and associated weights indicated by presence of weight numerals, and (ii) sentences including at least one verb from the at least one subject-verb-object based on the graph domain model 210. A representation of the recipe text is generated based on the at least one sentence which is classified in terms of at least one action (A), ingredient or mixtures (M) on which the at least one action is performed, and at least one condition (C). In an embodiment, the recipe text is represented as an action-mixture/ingredient-condition (A-M-C). An insert query string is generated from the generated representation based on the graph domain model 210. The generated insert query string is executed to store the formulations as the graph.

In an embodiment, the processor implemented method may further comprise, segregating, via the one or more hardware processors, at least one of: (i) a name, (ii) an ingredient list, and (iii) the recipe text from the at least one formulation text based on a predefined list of verbs and at least one mixture indicator. In an embodiment, the at least one verb from the predefined list of verbs may separate the ingredient listing from the recipe text. In an embodiment, the at least one action may correspond to the at least one verb from the predefined list of verbs. In an embodiment, the recipe text may be extracted by creating plurality of dictionary of verbs that are representative of actions performed on the ingredients and the mixtures. In an embodiment, an application programming interface (API) is provided to query details of the components of formulations across all stored formulations based on graph query language supported by the target graph database. In an embodiment, one or more edges join the one or more vertices in the given order. The properties of one or more vertices are as indicated in the graph domain model 210. The actions are the verbs from the predefined list of verbs.

In an embodiment, an open information extraction (Open IE) and a dependency parsing techniques augmented with dictionaries and stacking to obtain the action-mixture/ingredient-condition (A-M-C) structures from the recipe texts of formulations. In an embodiment, at least one of: a product name, ingredients, and associated weights are extracted using regular expressions.

In an embodiment, an ingredient-ingredient neighborhood is calculated to get details in which one or more ingredients that occur together in a formulation. In an embodiment, the combination of ingredients occurs as mixtures or phases based on a formulation format. For example, the information is processed to obtain a heat map of count of co-occurrences of approximately 1500 ingredients from corpus of formulations, where a zero value denotes the two ingredients never occur together in a formulation, positive value denotes the total count of co-occurrences of those two ingredients in the same phase/mixture and negative value denotes the total count of co-occurrences in the same formulations but different phases.

In an embodiment, an interactive platform is provided to facilitate the extraction/annotation and verification that correct data is extracted prior to the generation of insert queries into the graph database. In an embodiment, usage of at least one of: (i) a predefined list of 100+ commonly occurring verbs as actions in the recipe text, e.g., heat, inflame, stir, add, cool, pour, etc. as a heuristic in the subsequence implementation. In an embodiment, the verbs are collected from various sources of formulations; (ii) a predefined list of mixture indicators such as Phase x., Part x., .x: ., where x is alphabet; (iii) a set of regular expressions to identify presence of weights which occur as floating-point numbers.

In an embodiment, vast amount of textual data is available occurring in sources such as textbooks, handbooks, journal articles, and specialized web sites. The formulation extraction and retrieval system 200 is configured to construct such a database, and possible to query in intuitive ways to obtain information that can be used to put together product variants (i.e., alternate formulations). In an embodiment, one or more formulations exist in one or more sources with a portable document format (PDF).

In an embodiment, the one or more formulation texts are obtained as text files from the PDF files and apply one or more information extraction techniques along with a list of verbs and mixture indicators to separate name, ingredient list, and recipe from a formulation text. In an embodiment, a graph-based schema is created to extensible storage of this information as a graph in a graph database with a structured query language (SQL) like querying facility. In an embodiment, the system enables extraction, storage, and retrieval of details about chemical formulations based on at least one of (a) a natural language processing and an machine learning models to extract relevant details from textual sources b) store the details in the graph domain model 210 and retrieve the details using the SQL-like queries in the graph query language. In an embodiment, the system yields a detailed formulation database that one or more users can grow subsequently. In an embodiment, the system provides an ability to execute non-trivial queries along with additional facets of the database such as an ingredients dictionary (e.g., multiple names of an ingredient). In an embodiment, a graph of ingredients with their functionality enables finding ingredients with specific functionality arriving at intended properties of one or more end products.

Figure 3:
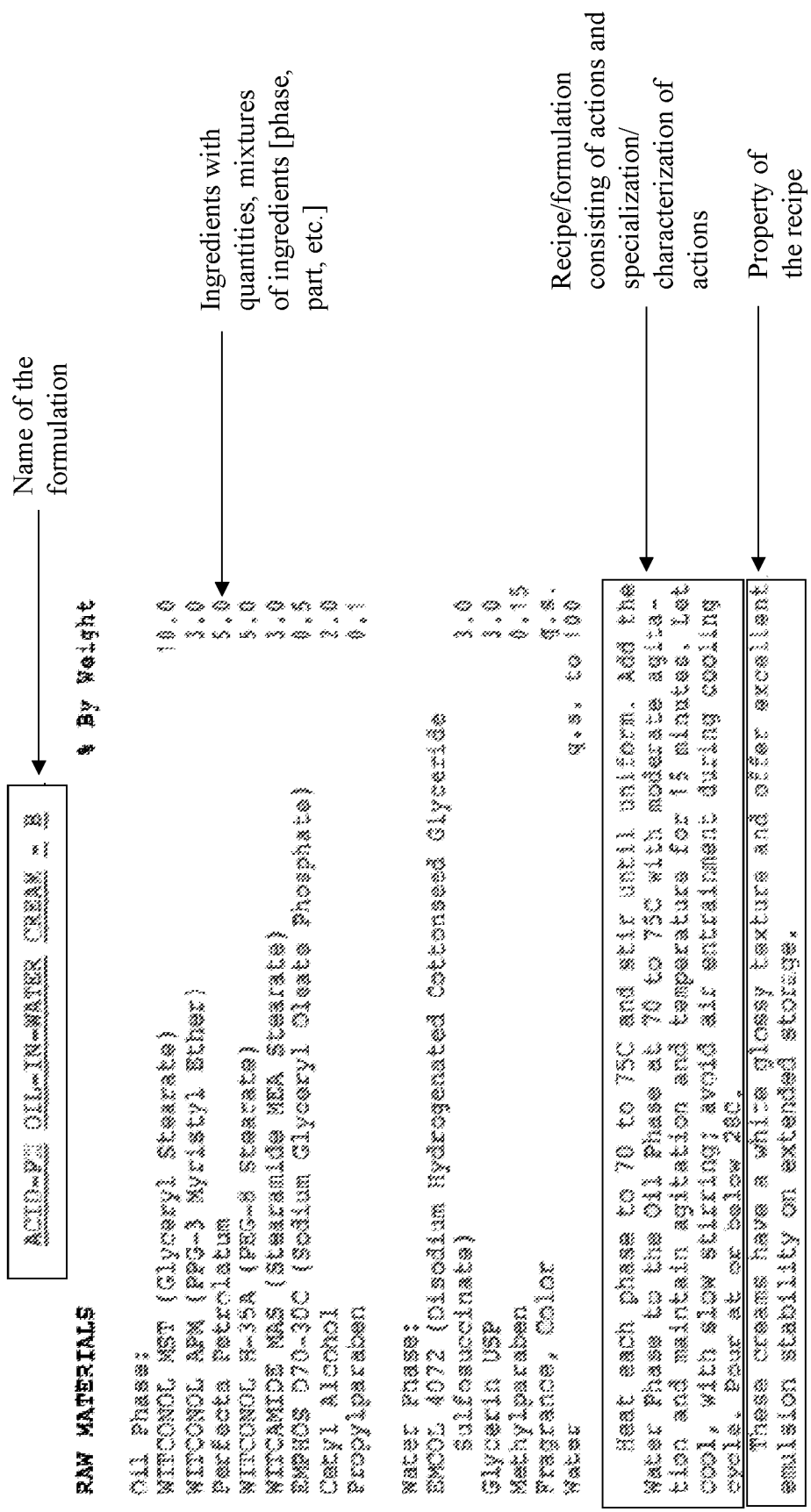
FIG. 3 illustrates an exemplary view of a structure of a formulation from a text source, according to some embodiments of the present disclosure.

FIG. 3 illustrates an exemplary view of a structure of the formulation from the text source, according to some embodiments of the present disclosure. In an embodiment, a chemical formulation text or a components of a formulation usually include at least one of name of the formulation, ingredients, mixtures (if any), weights or proportions of ingredients, and actions to be performed on the ingredients and mixtures, with conditions such as specific temperatures or states. In an embodiment, the texts are available as the PDF files and which are further extracted from the PDF files while preserving the layout to process the components, especially the ingredients, which are arranged in a columnar vertical manner in the source. In an embodiment, as many single-page PDFs from a single PDF file as the number of pages are obtained and then transforming all the PDFs representing pages of a volume to text files. In an embodiment, the formulation occurs in entirety in a single text file since most of the volumes containing formulation contain a single formulation per page. In an embodiment, a simple sentence (boundary) identification is applied for the text of each text file to find out whether include sentences, indicating that the formulation under consideration is not devoid of recipe text.

In an embodiment, with a preserved layout, the ingredient and associated weight occur in a single line of text. In an embodiment, the formulation may use the ingredients as a part of a mixture. In an embodiment, a small list of mixture phrases is prepared to recognize one or more mixture indicators separately. For example, the small list of mixture phrases is used to process corpus of cream formulations contains indicator phrases like 'phase a', 'phase b', 'phase c', 'oil phase', 'water phase', 'part a', 'part b', 'part c', and 'part d'. These indicator phrases appear in a line before the list of ingredients that are part of that mixture begins, as shown in FIG. 3.

In an embodiment, a regular expression is utilized to recognize the ingredients and associated weights. For example, the regular expression is "\d+\s*\.\s*\d+|q.s|USP". The "\s*" flag takes care of multiple white spaces between the integer and the fraction part of an ingredient's weight represented by flag "\d". The + sign in front of the flag indicates more than one digits in the integer part of the weight. Further, words such as q.s. (e.g., indicating "the amount which is needed") can be added as more of such phrases are encountered. In an embodiment, to process the ingredients as part of the mixture, identifying if there is a mixture and which of the dictionary entry matches and then till the next mixture is encountered in a line, all ingredients obtained till then are associated with the current mixture.

As illustrated in FIG. 3, the ingredients occur in the part of the text that is NOT a set of sentences (whereas the recipe text). In an embodiment, one or more recipe texts are extracted and represented as an action graph. The recipe text describes actions performed (a) on the ingredients individually; or (b) ingredients as a part of a mixture; and (c) on the mixtures if present. In an embodiment, considering one or more associate actions, along with conditions, to an ingredient or a mixture and the functionalities of each ingredient extracted are stored. In an embodiment, one or more nodes in the action graph represent operations or actions in the synthesis and the arguments associated with each operation represent ingredients or mixtures. Further, the edges in the action graph represent the association of an operation or an action with a) an argument or b) an ingredient or c) a mixture. The edges may also indicate an argument (resulting mixture or ingredient) as having originated from a given action.

In an embodiment, natural language processing is utilized that enables extracting and associating actions with the ingredients/mixture on which the actions are performed. In an embodiment, evaluating two approaches to obtain verbs and objects, respectively, actions and ingredients/mixtures, from each sentence of the recipe based on a subject-verb-object structure of a sentence.

In an embodiment, the first approach is known as open information extraction or open IE. The open IE implementation returns a triple of subject-verb-object. Specific implementations may return individual triple, replicating the subject and verb for each object if there are many objects. In an embodiment, open IE models are often trained by bootstrapping on other open IE models which could have been trained on manually extracted triples from sentences. In another embodiment, the second approach is using a dependency parser 208 to identify action and ingredient/mixtures from within each sentence of a recipe. In an embodiment, both the approaches consider use of a dictionary of verbs that are representative of actions performed on ingredients and/or mixtures.

For example, compiling list using the corpus of files and applying sentence identification and open IE (which returns subject-verb-object*triples) to identify the verbs. Some of the example verbs are 'maintain', 'heat', 'add', 'stir', 'moisturize', 'cool', 'extract', 'demineralize', 'mix', 'disperse', 'blend', 'emulsify', 'select', 'distil', 'chelate', and so on. Further, use a total of 129 lemmatized verbs thus collected as indicators that signify that a given sentence represents a part of the recipe.

In an embodiment, using the open IE with stacking for creating action graphs for all the corpus of formulations, includes extracting mixtures/ingredients, and actions in the form of objects and verb, respectively. For example, the verbs are representative of actions in the recipe. Consider, that open IE model returns multiple (and possibly overlapping) relation tuples of up to 4 values; first value is the subject of the sentence, the second value is the verb of the sentence, the third value is the first object of the sentence, and the fourth value is the second object of the sentence.

Considering, a first check if one of the verbs in the dictionary is present in a sentence. In an embodiment, such a sentence is prefixed with "I would" to add a subject to the sentence for processing using open IE. The reason for adding a subject to such sentence is that generally these are instructional or imperative sentences and lack a subject. In an observation, the open IE fails for imperative sentence returning an incorrect relation tuple. Therefore, transforming such sentences before further processing, e.g., 'Heat phase A and phase B to 70-75 C.' becomes 'I would heat phase A and phase B to 70-75 C.'. After applying open IE to the transformed sentence, a relation tuple to separate actions and their arguments are processed. In another observation, that the open IE may return verb and objects that contain the action as well as condition. The condition is differentiated from an action such that condition often describes the action in more detail. For example, in 'heat . . . to 70-75 C', 'heat' is the action and '70-75 C' is the condition. The relation tuples are processed to get Action->Mixture/Ingredient->Condition format (henceforth A-M-C).

For example, a check is performed each relation tuple is performed to find the number of values returned by considering all the recipe texts. If action and two arguments are present, then all mixtures (e.g., from the mixtures dictionary) and ingredients (from pre-processing) are determined. If a mixture or an ingredient exists, pushing to a stack is performed, and the action and the two arguments represent A-M-C. If a mixture or an ingredient does not exist, then the two arguments (values apart from the action verb) contain conditions. In this case, usage of all mixtures from the stack is considered and process output as Action, Mixture or Ingredient, and the two arguments as a single entry, which now represents A-M-C. If relation tuple only contains one argument, then use all mixtures from the stack is considered and process output as Action, Mixture or ingredient, and single argument to represent A-M-C.

In an embodiment, the recipe text includes instructions that are imperative sentences where an implicit actor performs some action on some object with a defined condition. For example, to recognize the mixtures and conditions properly, by conversion of multi-word mixtures to a single word is performed by adding an underscore between the words. Further, one or more sentences is identified and apply spacy dependency parser to each sentence.

In an embodiment, all the branches are extracted from the root in the dependency tree and then process each branch based on at least one of the following rules:
  a) A root is the action (when the root is a verb from the verbs dictionary).
  b) Branches includes mixtures and conditions.
  c) If a branch contains two actions, ignore the root action.
  d) Extract words in branches and match from original sentence to get the correct phrase to obtain condition.

In an exemplary embodiment, a rule-based extraction returns tuples of Action-Mixture (A-M), Action-Condition (A-C) or Action-Mixture-Condition (A-M-C). This result is pushed to a stack starting from the first sentence. Words are popped from the stack until action is encountered. If an A-M-C pair is present, then the A-M-C pair is taken out as a result. If A-M pair is present, then the A-M pair is taken out. If A-C pair is present, then the A-C pair is popped out from the stack and convert into A-M-C pair for all the unique mixtures remaining in the stack. Alternatively, if only A is encountered, then A is popped out and convert to A-M pair for all the unique mixtures remaining in the stack. Further, the previous steps are carried out recursively from the last sentence to the first sentence. The extracted results get rearranged according to their occurrence in the text, thus maintaining the order of actions.

FIG. 4 illustrates an exemplary view of the graph domain model 210 and queries for creams as a category of cosmetics and toiletry formulations, according to some embodiments of the present disclosure. In an embodiment, a labeled property graph includes at least one characteristics: a) contains nodes and relationships, b) nodes contain properties that are key-value pairs, and c) relationships are named and directed, and always have a start and end node. For example, the node "Formulation Type" indicates the high-level formulation category. Since all the formulations are of creams which are of the type cosmetic and toiletry, for all corpus of formulations under consideration, the label name of the "Formulation Type" is set to cosmetic and toiletry. In case, storing the details of a non-cosmetic and toiletry formulation, would begin by adding a node of type "Formulation Type" and setting the name property appropriately. Next, the node "Formulation Category" captures the specific type of cosmetic and toiletry formulation, in case of, creams (or cream). Typically, for other cosmetic and toiletry formulations like antiperspirants and deodorants, baby products, bath and shower products, beauty aids, fragrances and perfumes, would set the name accordingly.

In an embodiment, one or more corpus documents (e.g., journal articles, books, internal reports etc.) are collected which describe details of a formulation (e.g., a name, ingredients, weight proportions, recipe). In an embodiment, the one or more corpus documents are preprocessed. For example: considering a book which is split into one or more single-page PDF files. Further, one or more preprocessed documents are converted into a text format.

In an embodiment, the one or more text documents are filtered. For example, an identification of at least one sentence to find whether a text of each text file includes sentences indicating that a formulation under consideration is not devoid of a recipe text. Further, one or more mixtures is identified. For example, a small list of phrases associated with at least one mixture is prepared such as 'phase a', 'phase b', 'phase c', 'oil phase', 'water phase'. If any of the small list of phrases appear in a line before beginning of list of ingredients, then corresponding ingredients following the phrase are considered to be part of a corresponding mixture. The one or more ingredients associated weights are extracted by a custom designed regular expression \d+\s*\.\s*\d+|q.s|USP. In an embodiment, the "\s*" flag considers one or more white spaces between an integer and a fraction part of an ingredient's weight represented by flag "\d". The + sign in front of the flag indicates more than one digits in the integer part of the weight. Further, one or more words such as q.s. which indicates "the amount which is needed" can be added.

In an embodiment, a recipe text is extracted by creating one or more dictionary of verbs that are representative of actions performed on the ingredients and the mixtures. For example, at least one of below mentioned steps are involved in extracting the recipe text:

a. Mixtures/ingredients and actions are extracted in form of objects and verbs respectively. The verbs are representative of actions in the recipes;

b. Check if one of the verb in the dictionary is present in the sentence;

c. Prefix such a sentence with "I would" to add a subject to the sentence for processing using the open information extraction technique;

d. apply the open information extraction technique to the transformed sentence; and e. Process a tuple to separate actions and associated arguments and to obtain Action→Mixture/Ingredient→Condition format (A-M-C).

In an embodiment, using the dependency parser 208 at least one of: (a) converting multi-word mixtures to a single word by adding an underscore between words; (b) Identify sentences and apply spacy dependency parser to each sentence.

Figure 5A:
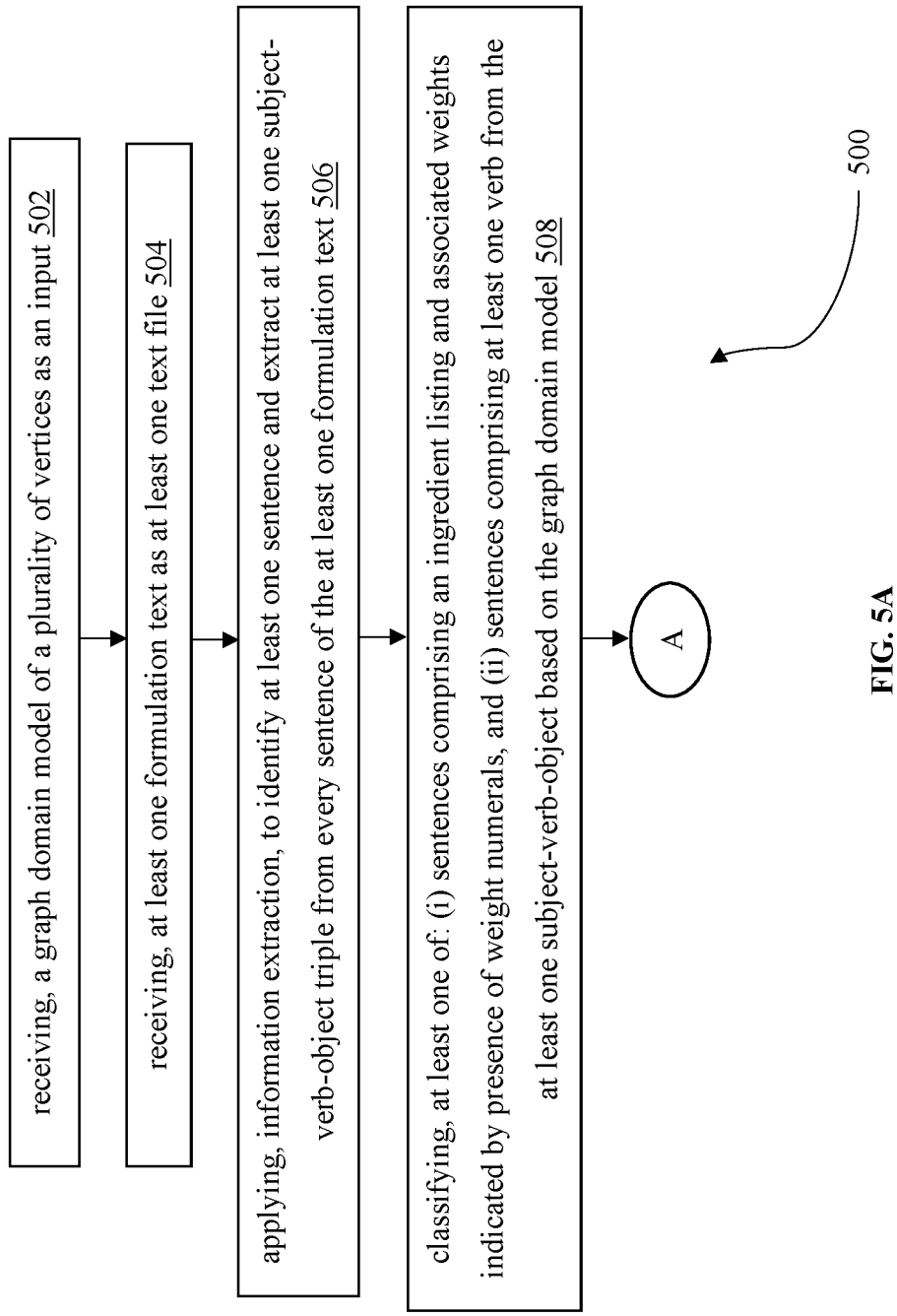
FIGS. 5A and 5B are exemplary flow diagrams illustrating a method of extracting an information, and graphical representation for the design of formulated products, according to some embodiments of the present disclosure.
Figure 5B:
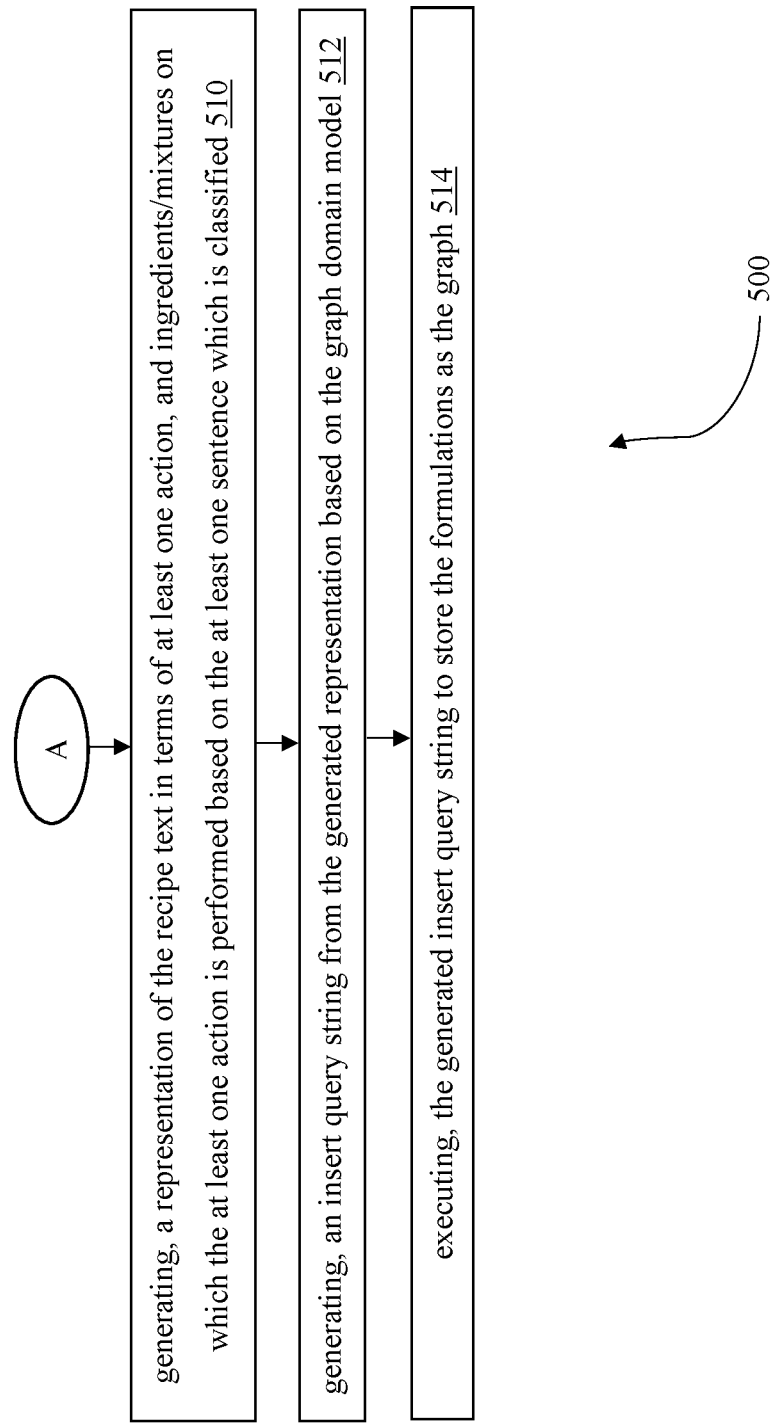

FIGS. 5A and 5B are exemplary flow diagrams illustrating a method 500 of extracting the information, and graphical representation for the design of formulated products, according to some embodiments of the present disclosure. In an embodiment, the system 100 comprises one or more data storage devices or the memory 102 operatively coupled to the one or more hardware processors 104 and is configured to store instructions for execution of steps of the method by the one or more processors 104. The flow diagram depicted is better understood by way of following explanation/description. The steps of the method of the present disclosure will now be explained with reference to the components of the system as depicted in FIGS. 1 and 2.

At step 502, a graph domain model 210 of a plurality of vertices is received as an input. In an embodiment, the plurality of vertices may correspond to at least one of: (i) a formulation type, (ii) a formulation category, (iii) a formulation ingredient, (iv) a mixture, (v) the recipe text, (vi) an action, (vii) a condition, and combination thereof. At step 504, at least one formulation text is received as at least one text file. At step 506, an information extraction is applied to identify at least one sentence and extract at least one subject-verb-object triple from every sentence of the at least one formulation text. At step 508, at least one of: (i) sentences including an ingredient listing and associated weights indicated by presence of weight numerals, and (ii) sentences including at least one verb from the at least one subject-verb-object based on the graph domain model 210 are classified. At step 510, a representation of the recipe text is generated in terms of at least one action, and ingredients/mixtures on which the at least one action is performed based on the at least one sentence which is classified. In an embodiment, the recipe text is represented as an action-mixture/ingredient-condition (A-M-C). At step 512, an insert query string is generated from the generated representation based on the graph domain model 210. At step 514, the generated insert query string is executed to store the formulations as the graph.

In an embodiment, the processor implemented method may further comprise, segregating, via the one or more hardware processors, at least one of: (i) a name, (ii) an ingredient list, and (iii) the recipe text from the at least one formulation text based on a predefined list of verbs and at least one mixture indicator. In an embodiment, the at least one verb from the predefined list of verbs may separate the ingredient listing from the recipe text. In an embodiment, the at least one action may correspond to the at least one verb from the predefined list of verbs. In an embodiment, the recipe text may be extracted by creating plurality of dictionary of verbs that are representative of actions performed on the ingredients and the mixtures.

The embodiments of present disclosure herein address unresolved problem of issues raised by usage of common file search (e.g., using "CTRL+F" search option) for sophisticated queries. The embodiment thus provides the graph domain model which enable extraction, storage, and retrieval of formulation components from textual sources such as (Formulation Type, Formulation Category, Formulation, Ingredient, Mixture, Recipe Text, Action, Condition). For instance, if Formulation Type were 'Cosmetic and Toiletry Formulation, and Formulation Category were 'Creams; with rest of the components stored as per the domain model, following example queries are possible:
a) Return graph of actions from recipe text of all general-purpose creams.
b) Get all the formulations by name which contain a specific ingredient such as Cetyl alcohol as one the ingredients.
c) Get quantity of all ingredients contain a specific ingredient such as Cetyl alcohol.

The embodiments of present disclosure in which the graph domain model is extensible, becomes possible to extract, store, and retrieve additional components such as properties of the formulations, sources of a formulation, and so on. The embodiments of present disclosure herein enable incremental expansion of formulations database stored as graphs as more formulation texts are processed as they become available.

The embodiments of present disclosure herein which include an explicit domain model for the domain of chemical formulations that explicates different components of a formulation. The embodiments of present disclosure herein which include the application of specialized natural language processing techniques such as open information extraction. Further, to process the formulation text so as to separately extract various chemical formulations. The embodiments of present disclosure herein which include generation of insert queries for the target graph database on the basis of the graph domain model so as to be able to store the separate components as part of a formulation graph.

The embodiments of present disclosure herein provide an ability to constructs dictionaries of ingredients, finalize the ingredients and order the actions to create a complete recipe and to test the generated product design variants with an in-silico model. The embodiments of present disclosure include an ability to search through an extensible database of product details, integration possibilities with in-silico models for testing, and reduced reliance on experts, leads to product design variant generation and testing that is faster, better, and cheaper respectively.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:
1. A implemented method of extracting an information associated with design of formulated products and representing as a graph, comprising:

(a) receiving, via one or more hardware processors, a graph domain model of a plurality of vertices as an input;

(b) receiving, via the one or more hardware processors, at least one formulation text as at least one text file;

(c) applying, via the one or more hardware processors, information extraction, to identify at least one sentence and extract at least one subject-verb-object triple from every sentence of the at least one formulation text, wherein information is processed to obtain a heat map of a plurality of count of co-occurrences from one or more formulations, wherein a zero value indicates two ingredients do not occur together in one or more formulations, a positive value indicates a total count of the co-occurrences of the two ingredients in a same phase, and a negative value indicates a total count of the co-occurrences in a same formulation and in a different phase ;

(d) classifying, via the one or more hardware processors, at least one of: (i) sentences comprising an ingredient listing and associated weights indicated by presence of weight numerals, and (ii) sentences comprising at least one verb from the at least one subject-verb-object based on the graph domain model;

(e) generating, via the one or more hardware processors, a representation of the recipe text based on the at least one sentence which is classified in terms of at least one action (A), mixtures (M) on which the at least one action is performed, and at least one condition (C);

(f) generating, via the one or more hardware processors, an insert query string from the generated representation based on the graph domain model; and (g) executing, via the one or more hardware processors, the generated insert query string to store the formulations as the graph.

2. The processor implemented method as claimed in claim 1, wherein the plurality of vertices corresponds to at least one of: (i) a formulation type, (ii) a formulation category, (iii) a formulation ingredient, (iv) a mixture, (v) the recipe text, (vi) an action, (vii) a condition, and combination thereof.

3. The processor implemented method as claimed in claim 1, further comprising, segregating, via the one or more hardware processors, at least one of: (i) a name, (ii) an ingredient list, and (iii) the recipe text from the at least one formulation text based on a predefined list of verbs and at least one mixture indicator.

4. The processor implemented method as claimed in claim 1, wherein the at least one verb from the predefined list of verbs to separate the ingredient listing from the recipe text, wherein the at least one action corresponds to the at least one verb from the predefined list of verbs.

5. The processor implemented method as claimed in claim 1, wherein the recipe text is extracted by creating plurality of dictionary of verbs that are representative of actions performed on the ingredients and the mixtures.

6. A system to extract an information associated with design of formulated products and representation as a graph, comprising:

a memory storing instructions;

one or more communication interfaces; and one or more hardware processors coupled to the memory via the one or more communication interfaces, wherein the one or more hardware processors are configured by the instructions to:

(a) receive, a graph domain model of a plurality of vertices as an input;

(b) receive, at least one formulation text as at least one text file;

(c) apply, information extraction, to identify at least one sentence and extract at least one subject-verb-object triple from every sentence of the at least one formulation text ,wherein information is processed to obtain a heat map of a plurality of count of co-occurrences from one or more formulations, wherein a zero value indicates two ingredients do not occur together in one or more formulations, a positive value indicates a total count of the co-occurrences of the two ingredients in a same phase, and a negative value indicates a total count of the co-occurrences in a same formulation and in a different phase;

(d) classify, at least one of: (i) sentences comprising an ingredient listing and associated weights indicated by presence of weight numerals, and (ii) sentences comprising at least one verb from the at least one subject-verb-object based on the graph domain model;

(e) generate, a representation of the recipe text based on the at least one sentence which is classified in terms of at least one action (A), mixtures (M) on which the at least one action is performed, and at least one condition (C);

(f) generate, an insert query string from the generated representation based on the graph domain model; and (g) execute, the generated insert query string to store the formulations as the graph.

7. The system as claimed in claim 6, wherein the plurality of vertices corresponds to at least one of: (i) a formulation type, (ii) a formulation category, (iii) a formulation ingredient, (iv) a mixture, (v) the recipe text, (vi) an action, (vii) a condition, and combination thereof.

8. The system as claimed in claim 6, wherein the one or more hardware processors (104) are further configured by the instructions to: segregate at least one of: (i) a name, (ii) an ingredient list, and (iii) the recipe text from the at least one formulation text based on a predefined list of verbs and at least one mixture indicator.

9. The system as claimed in claim 6, wherein the at least one verb from the predefined list of verbs to separate the ingredient listing from the recipe text, wherein the at least one action corresponds to the at least one verb from the predefined list of verbs.

10. The system as claimed in claim 6, wherein the recipe text is extracted by creating plurality of dictionary of verbs that are representative of actions performed on the ingredients and the mixtures.

11. One or more non-transitory machine-readable information storage mediums comprising one or more instructions which when executed by one or more hardware processors perform actions comprising:

(a) receiving, a graph domain model of a plurality of vertices as an input;

(b) receiving, at least one formulation text as at least one text file;

(c) applying, information extraction, to identify at least one sentence and extract at least one subject-verb-object triple from every sentence of the at least one formulation text, wherein information is processed to obtain a heat map of a plurality of count of co-occurrences from one or more formulations, wherein a zero value indicates two ingredients do not occur together in one or more formulations, a positive value indicates a total count of the co-occurrences of the two ingredients in a same phase, and a negative value indicates a total count of the co-occurrences in a same formulation and in a different phase;

(d) classifying, at least one of: (i) sentences comprising an ingredient listing and associated weights indicated by presence of weight numerals, and (ii) sentences comprising at least one verb from the at least one subject-verb-object based on the graph domain model;

(e) generating, a representation of the recipe text based on the at least one sentence which is classified in terms of at least one action (A), mixtures (M) on which the at least one action is performed, and at least one condition (C);

(f) generating, an insert query string from the generated representation based on the graph domain model; and (g) executing, the generated insert query string to store the formulations as the graph.

12. The one or more non-transitory machine-readable information storage mediums of claim 11, wherein the plurality of vertices corresponds to at least one of: (i) a formulation type, (ii) a formulation category, (iii) a formulation ingredient, (iv) a mixture, (v) the recipe text, (vi) an action, (vii) a condition, and combination thereof.

13. The one or more non-transitory machine-readable information storage mediums of claim 11, wherein the step of extracting an information associated with design of formulated products comprises segregating, at least one of: (i) a name, (ii) an ingredient list, and (iii) the recipe text from the at least one formulation text based on a predefined list of verbs and at least one mixture indicator.

14. The one or more non-transitory machine-readable information storage mediums of claim 11, wherein the at least one verb from the predefined list of verbs to separate the ingredient listing from the recipe text, wherein the at least one action corresponds to the at least one verb from the predefined list of verbs.

15. The one or more non-transitory machine-readable information storage mediums of claim 11, wherein the recipe text is extracted by creating plurality of dictionary of verbs that are representative of actions performed on the ingredients and the mixtures.

* * * * *